(12) United States Patent
Kim et al.

(10) Patent No.: US 8,780,078 B2
(45) Date of Patent: Jul. 15, 2014

(54) IN-CELL TYPE TOUCH PANEL

(75) Inventors: Cheol-Se Kim, Daegu (KR);
Man-Hyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 356 days.

(21) Appl. No.: 13/339,027

(22) Filed: Dec. 28, 2011

(65) Prior Publication Data

US 2012/0274603 A1    Nov. 1, 2012

(30) Foreign Application Priority Data

Apr. 27, 2011 (KR) .................. 10-2011-0039663

(51) Int. Cl.
*G06F 3/045* (2006.01)

(52) U.S. Cl.
USPC .................. 345/174; 349/12; 345/173

(58) Field of Classification Search
None
See application file for complete search history.

(56) References Cited

U.S. PATENT DOCUMENTS

| | | | |
|---|---|---|---|
| 2008/0062148 A1* | 3/2008 | Hotelling et al. | 345/174 |
| 2010/0079406 A1 | 4/2010 | Chen et al. | |
| 2010/0214262 A1* | 8/2010 | Ishizaki et al. | 345/174 |
| 2010/0302202 A1* | 12/2010 | Takeuchi et al. | 345/174 |
| 2011/0074727 A1* | 3/2011 | Kim | 345/174 |
| 2011/0210927 A1* | 9/2011 | Mizuhashi et al. | 345/173 |
| 2012/0105337 A1* | 5/2012 | Jun et al. | 345/173 |

FOREIGN PATENT DOCUMENTS

| | | | |
|---|---|---|---|
| JP | 2009204981 A | * | 9/2009 |
| TW | 200921620 | | 5/2009 |
| TW | 201007536 | | 2/2010 |
| TW | 201018998 | | 5/2010 |
| TW | 201028902 | | 8/2010 |
| TW | 201028905 | | 8/2010 |

OTHER PUBLICATIONS

Office Action issued in corresponding Taiwanese Patent Application No. 100148466, mailed May 12, 2014, 6 pages.

* cited by examiner

*Primary Examiner* — Jason Olson

(74) *Attorney, Agent, or Firm* — Brinks Gilson & Lione

(57) ABSTRACT

The present invention relates to an in-cell type touch panel includes first and second substrates opposite to each other, gate and data lines crossed each other to define a plurality of pixel regions, a pixel electrode at each of the pixel region, a pixel thin film transistor connected to the gate and data lines, and a pixel overlapped with the pixel electrode to have a common electrode, formed in a surface of the first substrate, a sensor electrode on a back side of the second substrate, and a touch sensor between the sensor electrode and the pixel, and a capacitance change between the sensor electrode and a touch object over the sensor electrode.

21 Claims, 17 Drawing Sheets

No Touch

Touch

IN-CELL TYPE TOUCH PANEL

This application claims the priority and the benefit under 35 U.S.C. §119(a) on Patent Application No. 10-2011-0039663 filed in Republic of Korea on Apr. 27, 2011, the entire contents of which are hereby incorporated by reference.

BACKGROUND

1. Field of the Invention

The present disclosure relates to touch panels, and more particularly to an in-cell type touch panel in which an electrode structure is modified to make a difference of capacitance larger between before and after a touch a capacitive type touch panel for enhancing touch sensitivity.

2. Discussion of the Related Art

As specific examples of the flat display devices, there are a liquid crystal display device LCD, a plasma display panel device PDP, a field emission display device FED, and an electro luminescence display device ELD each of which essentially has a flat display panel in common for producing a picture. The flat display panel is provided with one pair of transparent insulating substrates bonded opposite to each other with a unique light emitting or polarizing material layer disposed therebetween.

Of the flat display devices, the liquid crystal display device displays a picture by controlling light transmissivity of liquid crystals by using an electric field. To do this, the liquid crystal display device is provided with a display panel having liquid crystal cells, a backlight unit for directing the light to the display panel, and a driving circuit for driving the liquid crystal cells.

Recently, requirements for addition of a touch panel to the liquid crystal display device are increasing for perception of a portion of the touch panel touched with a hand or additional input means and transmission of additional information matched to the touch.

And, depending on touch sensing types, in the touch panels, there are a resistance type, a capacitive type, and an infrared ray sensing type, and, recently, the capacitive type is paid attention in small sized models, taking convenience of fabrication, sensing capability, and so on into account.

A related art capacitive type touch panel will be described with reference to attached drawings.

FIGS. 1A and 1B illustrate sections showing states of an electric field before and after a touch a related art capacitive type touch panel respectively, and FIGS. 2A and 2B illustrate equivalent circuits of FIGS. 1A and 1B, respectively.

Referring to FIGS. 1A and 2A, the related art capacitive type touch panel, which employs an interactive capacitive type, is provided with a plurality of driving electrodes 13 Tx formed in directions different from one another on a substrate 10, a plurality of sensing electrodes 11 Rx, and an insulating film 12 formed between layers of the sensing electrodes 11 and the driving electrodes 13.

In this instance, the driving electrodes 13 and the sensing electrodes 11 are arranged adjacent to each other on the same plane. According to this, upon application of a voltage to the driving electrodes 13 Tx: Txn, Txn+1 in succession, a fringe field is formed between the sensing electrode 11 Rx and an adjacent driving electrode 13 to cause capacitance C0.

Referring to FIGS. 1B and 2B, when touched with a touch object, such as a finger or a pen, the touch object functions as a ground source, to form capacitance Cf with the sensing electrode 11 and to change the fringe field formed between the sensing electrode 11 and the driving electrode 13, changing the capacitance to C0'.

According to this, if the driving voltage is applied to the driving electrodes 13 in succession at the time of the touch, a sensing signal is forwarded to the sensing electrode 11 in proportion to an amount of capacitance change C0-C0' and the driving voltage at the time of the touch.

In this case, though it is required to make the capacitance change C0-C0' at the time of the touch for making the signal forwarded thus, the related art capacitive type touch panel shown in the drawings, using the fringe field between the sensing electrode and the driving electrode, has small capacitance due to small influence of the fringe field to the interactive capacitance between the driving electrodes and the sensing electrodes, to cause a problem of poor touch sensitivity.

Moreover, if the touch sensitivity is poor thus, a large sized touch panel has poor reliability of touch sensing due to the small amount of change of the interactive capacitance at the time of the touch in comparison to a load which becomes the larger as a distance to an electrode to which the driving voltage is applied the farther.

Thus, the related art capacitive type touch panel has the following problems.

The capacitive type touch panel used currently uses the interactive capacitive sensing type for perceiving multiple touches.

In this case, upon application of the driving voltage to the driving electrode Tx, a sensing voltage at the time of the touch is forwarded to the sensing electrode Rx. At the time of the touch, capacitance between the hand and the electrodes is formed, and the initial capacitance C0 between the driving electrode and the sensing electrode is changed to sensed capacitance C0' by the change of the fringe field. Therefore, if the driving signal is applied to the driving electrode at the time of the touch, the sensing signal is forwarded to the sensing electrode in proportion to the amount of change of the capacitance and the driving voltage at the time of the touch. Most of the touch electrodes used currently, using the fringe filed, has small capacitance due to small influence of the fringe field to the interactive capacitance between the driving electrodes and the sensing electrodes, to cause a problem of poor touch sensitivity.

Moreover, if the touch sensitivity is poor thus, a large sized touch panel has poor reliability of touch sensing, making application of the related art capacitive type touch panel difficult.

BRIEF SUMMARY

An in-cell type touch panel includes a first substrate and a second substrate opposing each other with a liquid crystal layer disposed therebetween, in a surface of the first substrate, a gate line and a data line cross each other to define a pixel region, a pixel electrode at the pixel region, a pixel thin film transistor connected to the gate line and the data line that drives the pixel electrode, and a pixel overlapped with the pixel electrode to have a common electrode divided by patterning, a sensor electrode on a back side of the second substrate, and a touch sensor that senses a capacitance change between the sensor electrode and the pixel, and a capacitance change between the sensor electrode and a touch object over the sensor electrode, and outputs a sensing signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DRAWINGS AND THE PRESENTLY PREFERRED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

The in-cell type touch panel of the present invention has a sensor driving electrode and a sensor sensing electrode provided in a surface of a TFT array substrate having a plurality of pixels, and a sensor electrode formed on a back side of a color filter array substrate to overlap with the sensor driving electrode and the sensor sensing electrode. That is, the sensor electrode is provided on a plate additionally, to make the capacitance change before and after a touch taken place by the sensor driving electrode and the sensor sensing electrode larger for improving touch sensing sensitivity. Especially, a common electrode or a line of the TFT array is directly used as the sensor driving electrode and the sensor sensing electrode, or the sensor driving electrode and the sensor sensing electrode are formed by patterning on the same layer with the common electrode or the line of the TFT array, such that the TFT array contains the sensor driving electrode and the sensor sensing electrode, and can be formed without any additional process.

In the meantime, a first substrate including the TFT array is called as a TFT array substrate, and a second substrate including a black matrix layer and a color filter layer is called as a color filter array substrate.

Embodiments of the present invention will be described in detail.

First Embodiment

Figure 1A:
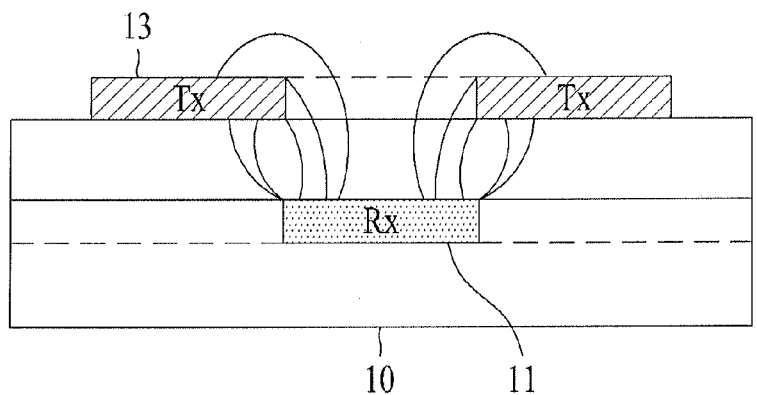
FIGS. 1A and 1B illustrate sections showing states of an electric field before and after a touch a related art capacitive type touch panel, respectively.
Figure 1B:
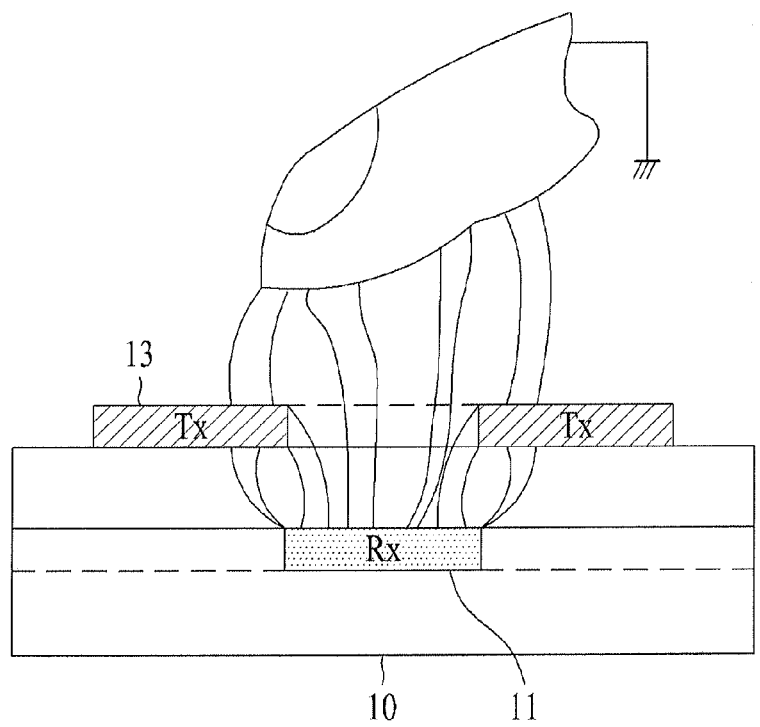
Figure 2A:
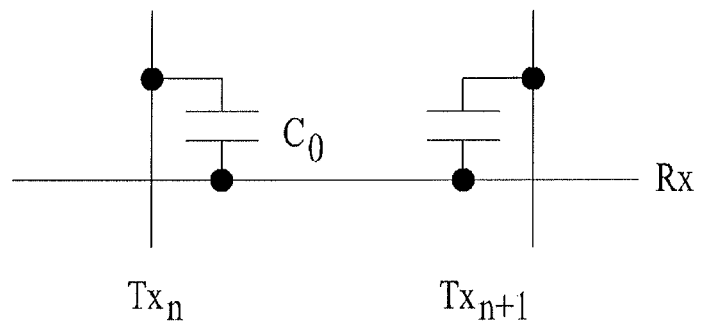
FIGS. 2A and 2B illustrate equivalent circuits of FIGS. 1A and 1B, respectively.
Figure 2B:
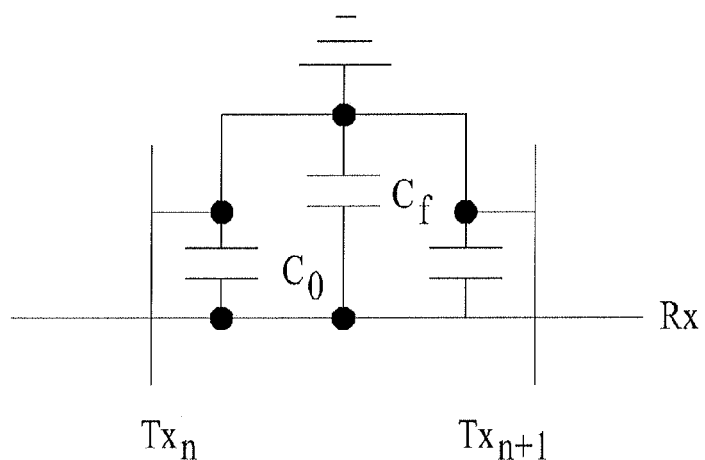
Figure 3:
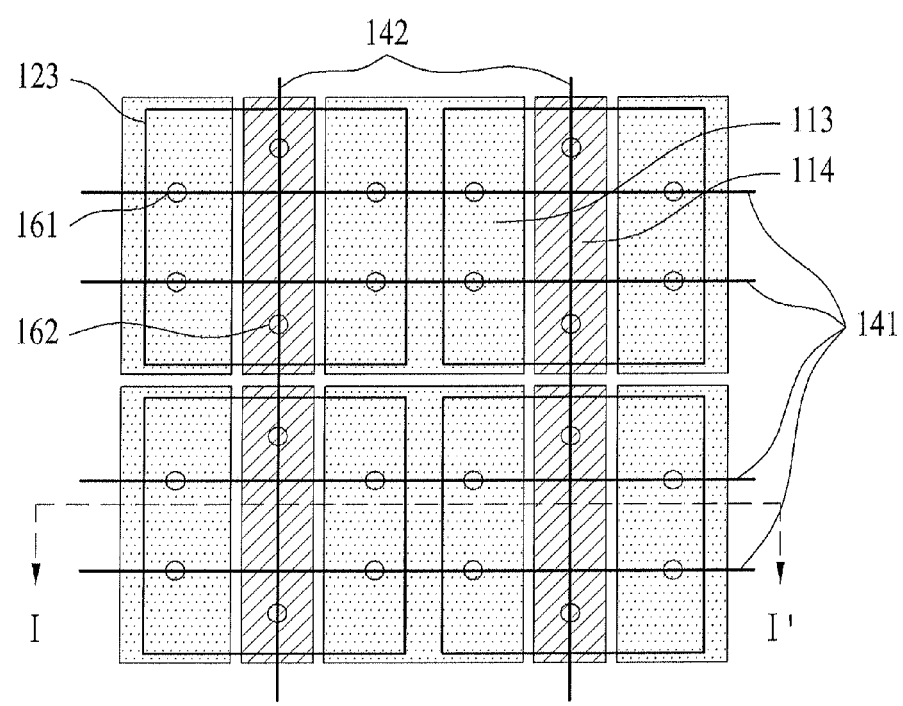
FIG. 3 illustrates a plan view of an in-cell type touch panel in accordance with a first preferred embodiment of the present invention.
Figure 4:
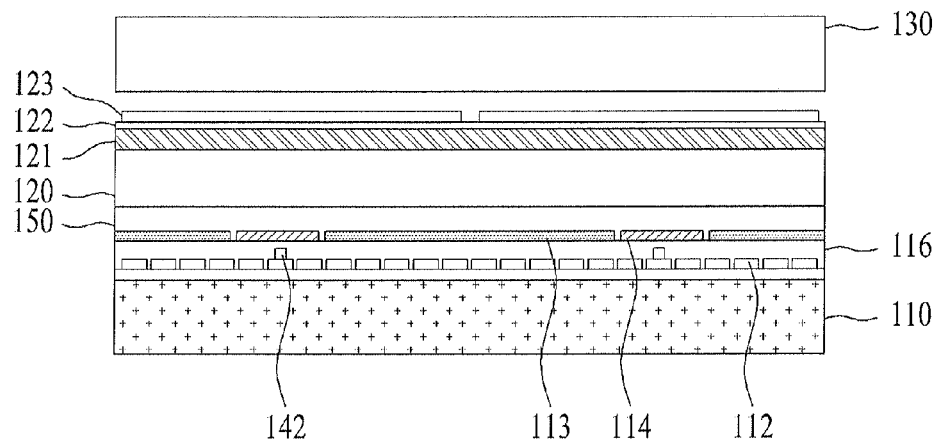
FIG. 4 illustrates a section across the line I-I' in FIG. 3.

FIG. 3 illustrates a plan view of an in-cell type touch panel in accordance with a first preferred embodiment of the present invention, and FIG. 4 illustrates a section across the line I'I' in FIG. 3.

Referring to FIGS. 3 and 4, the in-cell type touch panel includes a first substrate 110 and a second substrate 120 opposite to each other with a liquid crystal layer 150 disposed therebetween, a sensor driving electrode 113 and a sensor sensing electrode 114 in a surface of the first substrate 110, a sensor driving line 141 and a read out line 142 connected to the sensor driving electrode 113 and the sensor sensing electrode 114 respectively, and a sensor electrode 123 on a back side of the second substrate 120.

In this instance, capacitance takes place at three places centered on the sensor electrode 123 (Defined as A), i.e., Cx between the sensor driving electrode 113 and the sensor electrode 123, Cy between the sensor sensing electrode 114 and the sensor electrode 123, and Cf between a touch object and the sensor electrode 123, of which sum defines the capacitance. Changes of the three kinds of the capacitance take place before and after the touch, enabling to detect the touch by sensing the changes.

In the meantime, a common electrode or a line of the TFT array on the first substrate is directly used as the sensor driving electrode 113 and the sensor sensing electrode 114, or the sensor driving electrode 113 and the sensor sensing electrode 114 are formed by patterning on the same layer with the common electrode or the line of the TFT array, such that the first substrate 110 contains the sensor driving electrode and the sensor sensing electrode without providing an additional layer, enabling to prevent any increase of step or cost.

The TFT array includes gate lines (See 171 in FIGS. 9A and 10A) and data lines (See 153 in FIGS. 9D and 10D) crossing each other to define pixel regions, pixel electrodes 112 at the pixel regions, pixel thin film transistors (See TFT in FIGS. 9F and 10F) each connected to the gate line and the data line for driving the pixel electrode, and a pixel overlapped with the pixel electrode 112 to have a common electrode divided by patterning.

The attached drawing illustrates a structure in which, for an example, a fringe field between the pixel electrode 112 and the common electrode is used, wherein the common electrode is patterned to divide the common electrode into the sensor driving electrode 113 and the sensor sensing electrode 114. The sensor driving electrode 113 and the sensor sensing electrode 114 are formed by patterning a transparent conductive film to be spaced from each other.

And, the sensor driving line 141 and the read out line 142 connected to the sensor driving electrode 113 and the sensor sensing electrode 114 respectively are arranged to cross each other. The sensor driving line 141 is on the same layer with the gate line, and the read out line 142 is on the same line with the data line.

The sensor driving line 141 is connected to a sensor driving driver (Not shown) to be driven together with the gate lines in succession, and the read out line 142 is connected to a read out driver (Not shown) for detecting the sensing signal. In this case, the read out line 142 detects an amount of change of voltage or an amount of change of charge caused by coupled capacitance of the sensor capacitance Cf between the sensor electrode 123 and the touch object, and first and second capacitance Cx and Cy formed between the sensor electrode 123 and the sensor driving electrode 142 and the sensor sensing electrode 143.

In the meantime, the sensor driving line 141 may be used as the gate line.

In the in-cell type touch panel, the sensor electrode 123, in an island shape, is kept in a floated state without application of a separate voltage.

In the meantime, each of the sensor driving electrode 113 and the sensor sensing electrode 114 which are the common electrode divided by patterning may be arranged matched to a plurality of the pixels. In this instance, the sensor driving electrode 113 and the sensor sensing electrode 114 extend in the same direction spaced from each other, and the sensor electrode 123 is in an island shape overlapped with one of the sensor sensing electrodes 114 and a portion of each of the sensor driving electrodes 113 on both sides of the one of the sensor sensing electrodes 114.

Depending on cases, the sensor electrode 123 may be in the island shape overlapped with one of the sensor driving electrode 113 and a portion of each of the sensor sensing electrode 114 on both sides of the one the sensor driving electrode 113.

The sensor electrode 123 occupies an area formed to match with a unit of the touch sensor formed at the pixel of a display panel. This is matched to a touch area which corresponds to a plurality of pixels, and arranged regularly.

Figure 9A:
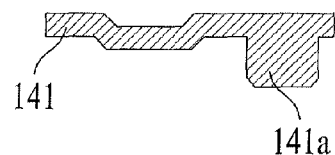
FIGS. 9A~9F illustrate plan views showing the steps of a method for fabricating a sensor driving electrode in an in-cell type touch panel in accordance with a first preferred embodiment of the present invention.
Figure 9A:
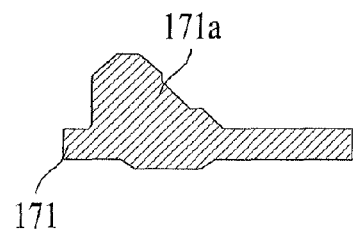
Figure 9B:
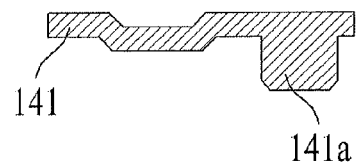
Figure 9B:
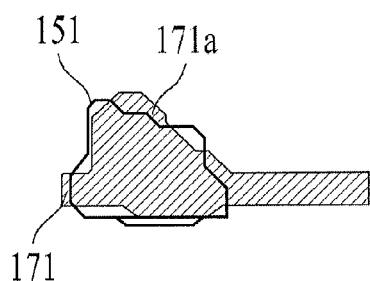
Figure 9C:
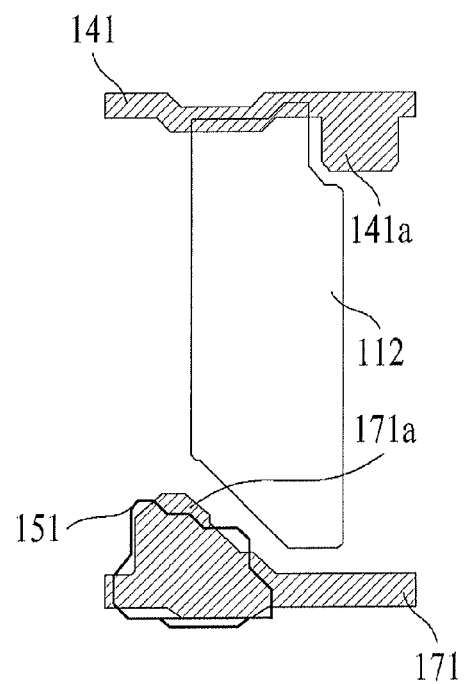
Figure 9D:
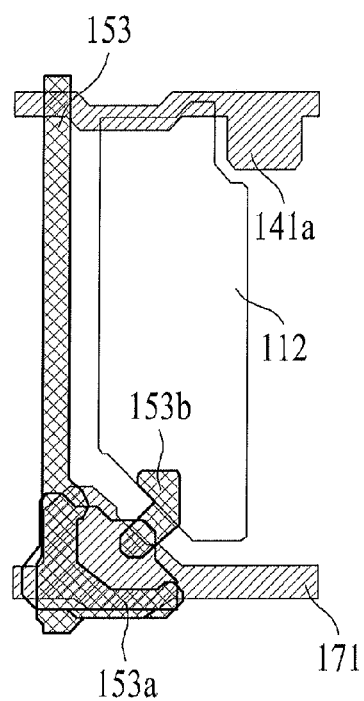
Figure 9E:
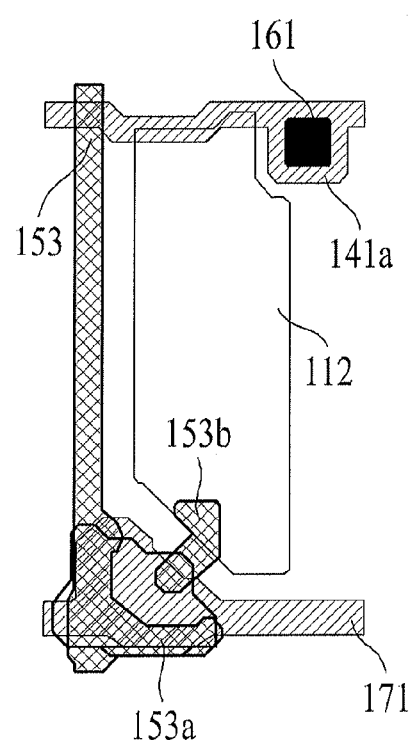
Figure 9F:
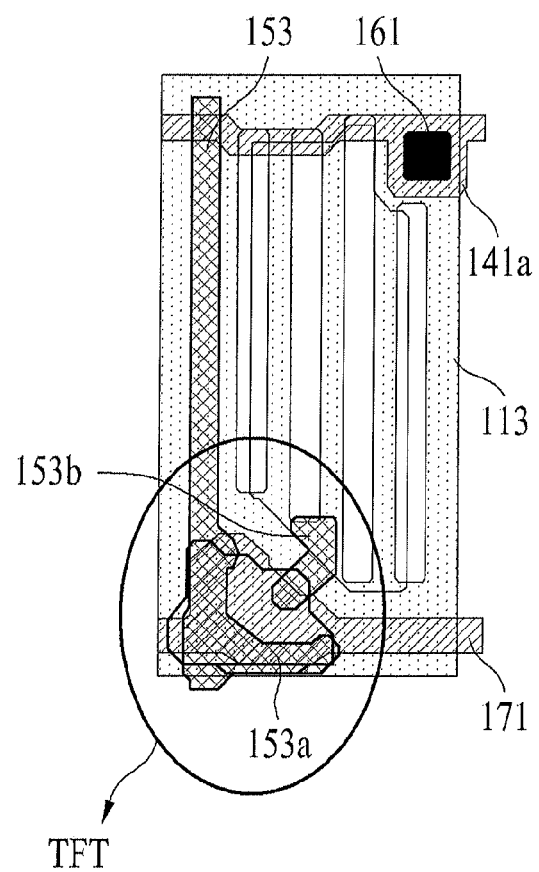
Figure 10A:
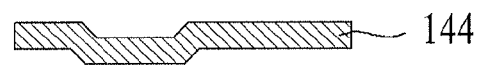
FIGS. 10A~10F illustrate plan views showing the steps of a method for fabricating a sensor sensing electrode in an in-cell type touch panel in accordance with a first preferred embodiment of the present invention.
Figure 10A:
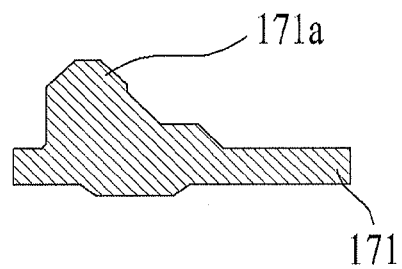
Figure 10B:
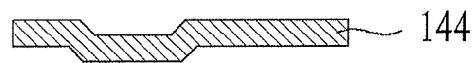
Figure 10B:
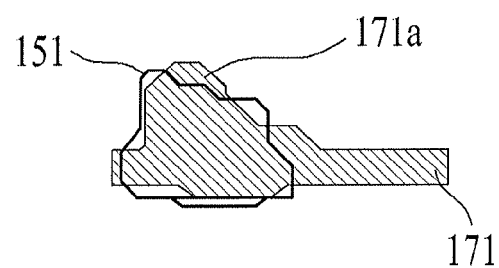
Figure 10C:
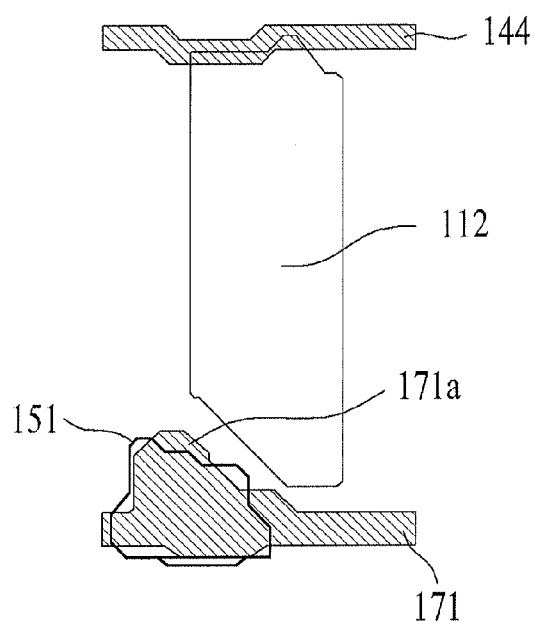
Figure 10D:
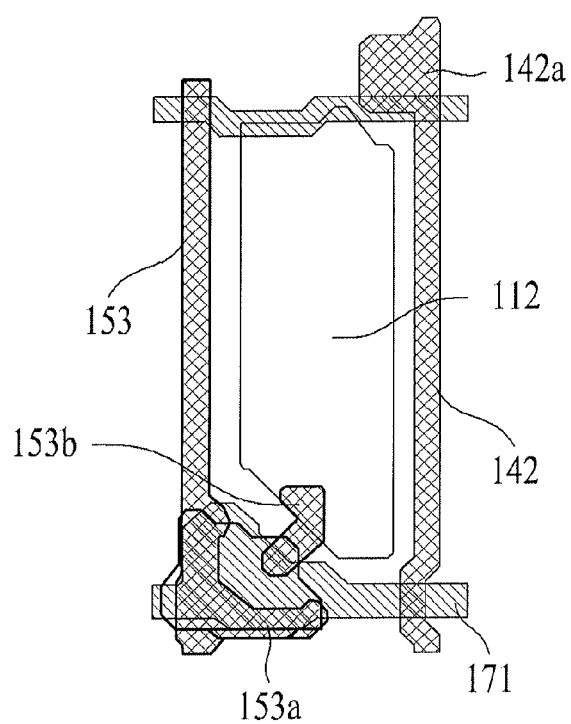
Figure 10E:
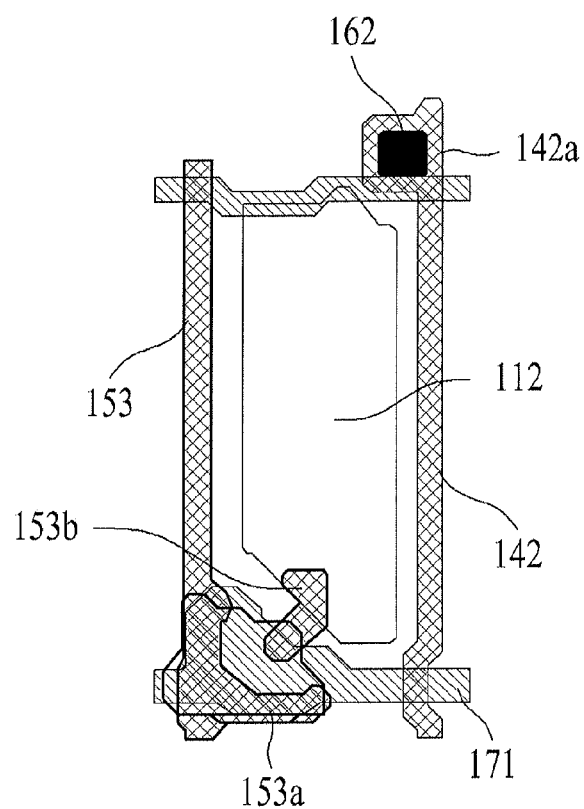
Figure 10F:
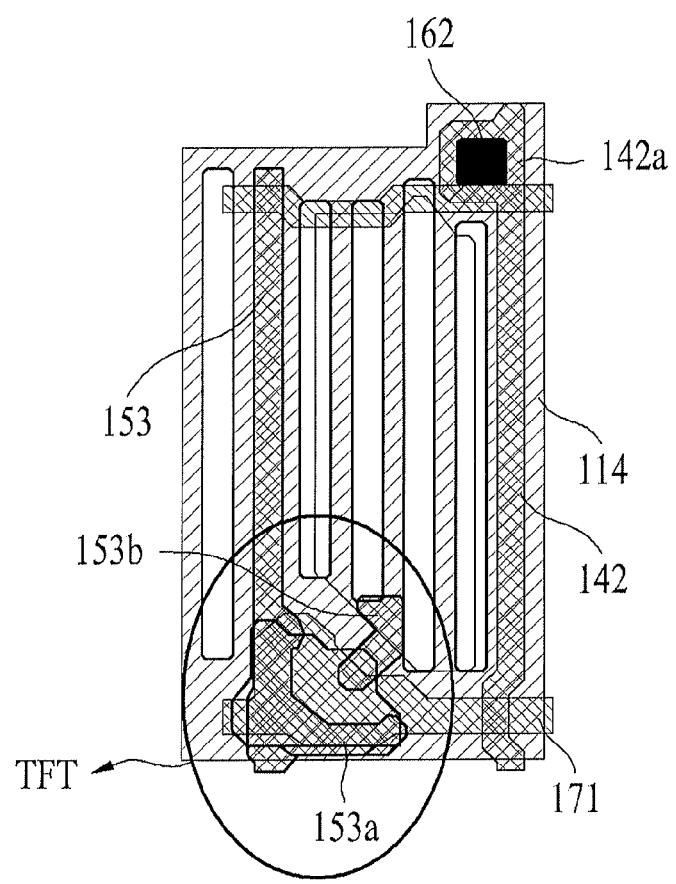

In order to form an in-plane field smoothly at the time of driving the display, the sensor driving electrode 113 and the sensor sensing electrode 114 may have a plurality of parallel slits in each plate (See FIGS. 9F and 10F).

Formed on the first substrate 110, there are a gate insulating film 111 formed on the gate line/the sensor driving line 141, the data line 153/the read out line 142 formed on the gate insulating film 111, and a protective film 116 to cover the data line 153/the read out line 142 and the pixel electrodes 112.

There is a first contact hole 161 formed in each of the protective film 116, and the gate insulating film 111 between the sensor driving line 141 and the sensor driving electrode 113. And, there is a first contact hole 161 formed in each of the protective film 116, and the gate insulating film 111 between the read out line 142 and the sensor sensing electrode 114.

An arrangement of the first contact hole 161 and the second contact hole 162 may vary with a layer and composition of the sensor driving electrode and the sensor sensing electrode. And, the first contact hole 161 and the second contact hole 162 are provided for making contact with metal to reduce resistance of the sensor driving electrode and the sensor sensing electrode.

In the meantime, in the embodiment shown, the display is driven in the fringe filed mode in which the common electrode divided into the sensor driving electrode and the sensor sensing electrode covers the pixel electrodes, but not limited to above. The display may be driven in an IPS (In Plane Switching) Mode. In the IPS mode, the pixel electrode and the common electrode are positioned alternately, and the pixel electrode and the common electrode may be used as the sensor driving electrode and the sensor sensing electrode.

The sensor driving electrode 113 and the sensor sensing electrode 114 are driven divided in the touch sensing and the display driving. In the display driving, the common voltage is applied, and in the touch sensing, the sensor driving electrode 113 and the sensor sensing electrode 114 divided thus perform dividing application of the driving voltage and forwarding of the sensing voltage.

The in-cell type touch panel of the present invention has the touch sensor with a touch sensing function in the display panel, wherein the touch sensor has a function for sensing a capacitance change between the sensor electrode 123 on the back side of the second substrate 120 and the pixel in the display panel, and a capacitance change $\Delta$Cm between the sensor electrode 123 and the touch object (Not shown) over the sensor electrode 123, and outputting the sensing signal.

Though not shown, the second substrate 120 includes the black matrix layer and the color filter layer in a surface thereof further. And, in order to keep a thickness of the liquid crystal layer 150, a column spacer (Not shown) may be further provided between the first substrate 110 and the second substrate 120.

And, the sensor electrode 123 is formed on the back side of the second substrate 120 over a polarizing plate 121.

Preferably, for protection of the polarizing plate 121, after attaching a transparent protective film 122 on the polarizing plate 121 additionally, the transparent protective film 122 is patterned to form the sensor electrode 123.

And, between a top side of the sensor electrode 123 and the touch object, there may be a protective member 130 additionally provided thereto. The protective member 130 may be a sheet of glass such as tempered glass or a transparent film. The protective member 130 may be selected from materials having an adequate lifetime enough to protect the display panel against user's ceaseless touch and good transmissivity not to affect an image being displayed from beneath.

Figure 5A:
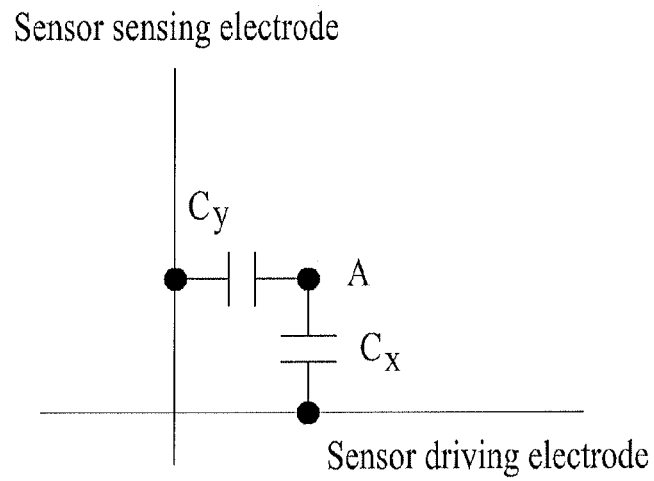
FIGS. 5A and 5B illustrate equivalent circuits of an in-cell type touch panel in accordance with a preferred embodiment of the present invention before and after a touch, respectively.
Figure 5B:
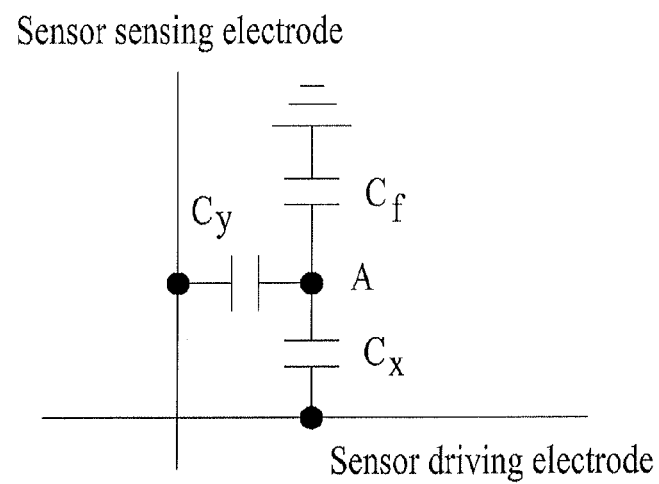
Figure 6:
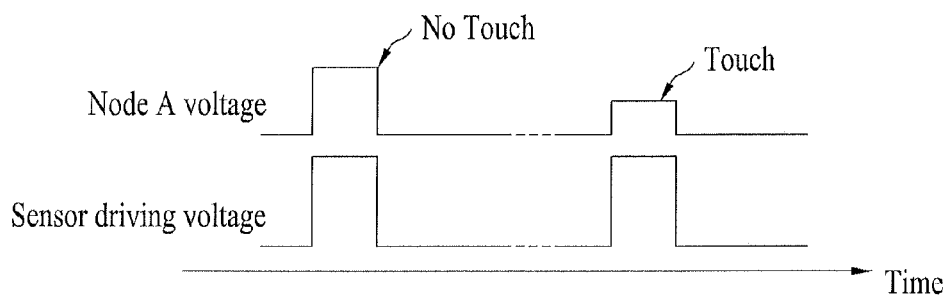
FIG. 6 illustrates a timing chart of an in-cell type touch panel in accordance with a preferred embodiment of the present invention.

FIGS. 5A and 5B illustrate equivalent circuits of an in-cell type touch panel in accordance with a preferred embodiment of the present invention before and after a touch respectively, and FIG. 6 illustrates a timing chart of an in-cell type touch panel in accordance with a preferred embodiment of the present invention.

Referring to FIG. 5A, if it is assumed that the sensor electrode 123 is a node A, the in-cell type touch panel has the capacitance Cx formed between the node A and the sensor driving electrode, and the Cy between the node A and the sensor sensing electrode before the touch. The sensor driving electrode is in contact with the sensor driving line overlapped therewith, and the sensor sensing electrode is in contact with the read out line overlapped therewith.

And, referring to FIG. 5B, at the touch, the capacitance Cy is formed between the touch object (For an example, a finger) and the node A.

Referring to FIG. 6, if the sensor driving voltage is applied, a voltage change of the node A is sensed at the read out line connected to the sensor sensing electrode owing to coupling capacitance of Cx and Cy. If the touch is made, since the sensor capacitance Cf is formed between the node A and the sensor electrode 123, if the sensor driving voltage is applied, a node A voltage will be reduced by the sensor capacitance Cf, enabling to locate a touch position by sensing the reduction of the sensor capacitance.

Referring to the equivalent circuits of FIGS. 5A and 5B, if the sensor driving voltage is applied to the sensor driving line, a quantity of charge induced to the read out line can be obtained by the following equations before and after the touch. Where, Vsl denotes a low voltage applied to the sensor driving line, and Vsh denotes a high voltage applied to the sensor driving line.

That is, before the touch, the quantity of the charge is fixed as a sum of the capacitance of the sensor electrode and the pixel as shown in an equation 1.

$$Q_{No\_touch} = \frac{C_x C_y}{(C_x + C_y)}(V_{sh} - V_{sl}) \quad (1)$$

And, after the touch, as the sensor capacitance Cf between the sensor electrode and the touch object is formed additionally, the quantity of the charge can be as the following equation 2.

$$Q_{Touch} = \frac{C_x C_y}{(C_x + C_y + C_F)}(V_{sh} - V_{sl}) \quad (2)$$

Therefore, the change of the capacitance before and after the touch is fixed as the following equation 3.

$$\Delta Q = \frac{C_x C_y C_F}{(C_x + C_y)(C_x + C_y + C_F)}(V_{sh} - V_{sl}) \quad (3)$$

If the Cx and the Cy are designed equal, and the capacitance between the touch object and the read out line or the sensor driving line is $C_0$ (A self capacitance) the capacitance change has the following equation 4.

$$\Delta C = \frac{C_x C_y C_F}{(C_x + C_y)(C_x + C_y + C_F)} = \frac{1}{2C_0} \quad (4)$$

It can be known that this result is suitable for pulling up touch sensitivity and reducing noise as an amount of the capacitance change at the touch changes to a half of the self capacitance.

That is, in view of circuit in the in-cell type touch panel of the present invention, a plurality of sensor driving lines are formed on the first substrate (TFT array substrate), a plurality of read out lines are formed to cross the sensor driving lines, the sensor electrodes are formed at every cross portion of the sensor driving lines and the read out lines, the insulating film is formed between the sensor driving lines (Or sensor driving electrodes) and the sensor electrodes to form the first capacitance Cx, and the insulating film is provided between the read out lines (Or the sensor sensing electrodes) and the sensor electrodes to form the second capacitance Cy.

And, there is the protective member 130 provided to the top side of the sensor electrode 123 additionally to form the sensing capacitance between the sensor electrode 123 and the touch object.

A method for driving the in-cell type touch panel of the present invention is as follows.

The sensor driving signal is applied to the plurality of sensor driving lines starting from an upper side or lower side in succession. At the time of supply of the sensor driving signal, the voltage change or the charge quantity change caused by the coupling capacitance of the first capacitance Cx, the sensor capacitance Cf, and the second capacitance Cy is read in through the read out driver connected to the read out lines, to detect whether the touch is made or not and the touch position.

Second Embodiment

Figure 7:
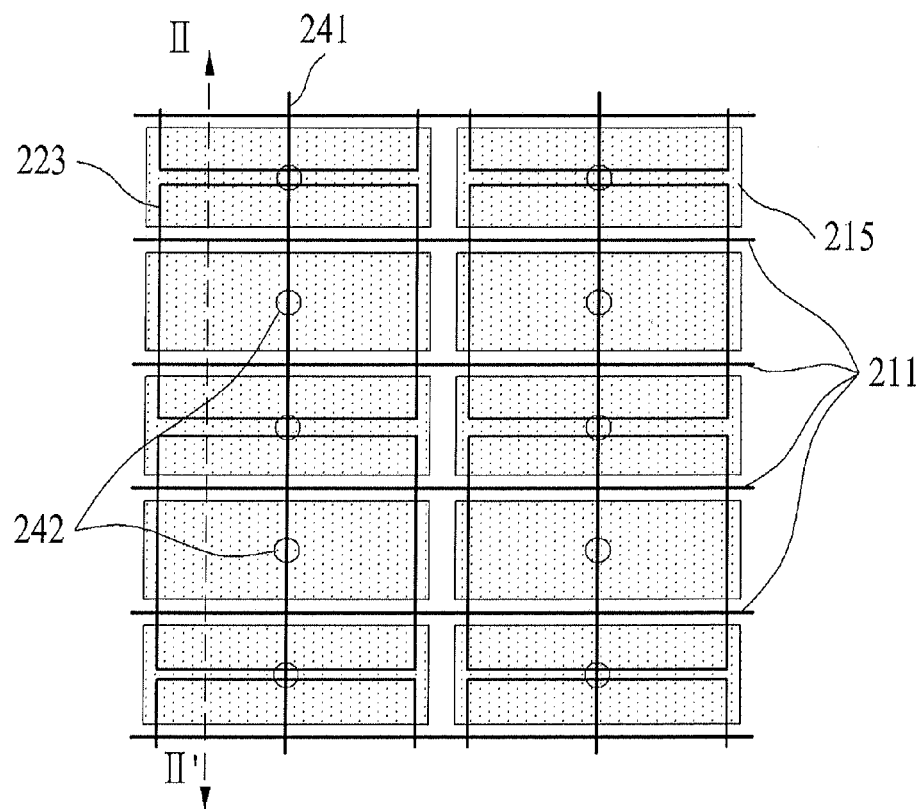
FIG. 7 illustrates a plan view of an in-cell type touch panel in accordance with a second preferred embodiment of the present invention.
Figure 8:
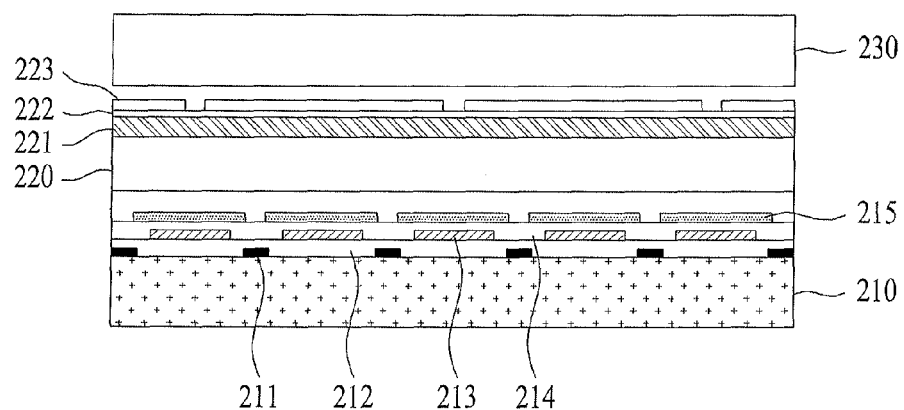
FIG. 8 illustrates a section across the line II-II' in FIG. 7.

FIG. 7 illustrates a plan view of an in-cell type touch panel in accordance with a second preferred embodiment of the present invention, and FIG. 8 illustrates a section across the line II-II' in FIG. 7.

Referring to FIGS. 7 and 8, the in-cell type touch panel includes sensor driving lines 211 and read out lines 241 arranged to cross each other, and only sensor sensing electrodes 215 divided taking the sensor driving lines 211 as boundaries connected to the read out lines 241. In this case, the sensor sensing electrodes 215 are formed by dividing a common electrode which forms a fringe field with pixel electrodes 213 by patterning, and no separate sensor driving electrodes are formed. That is, the sensor driving lines 211 also function as the sensor driving electrodes.

Alike the first embodiment described before, at the time of the display drive, the sensor sensing electrode 215 has a common voltage applied thereto, and at the time of touch drive, the sensor sensing electrodes 215 which are overlapped as one sensor electrode have a pulse voltage applied thereto at a time such that a sensing signal is perceived at the read out line 241.

In this instance, if the sensor driving line 211 is a gate line, at the time of touch sensing, the gate line has a gate low voltage Vgl applied thereto.

In the meantime, the sensor electrodes 223 are formed to cross the sensor driving lines 211 each in an island shape in which the sensor electrode 223 overlaps with an entire width of one center sensor sensing electrode 215 and a portion of a width of each of the sensor sensing electrodes 215 adjacent to the one center sensor sensing electrode 215. That is, the sensor electrode 223 is in a floated state without application of any voltage thereto.

An insulating film 212 between the sensor driving line 211 and the pixel electrode 213 on a first substrate 210 may be the gate insulating film described before.

And, there is a protective film 214 formed between the pixel electrode 213 and the sensor sensing electrode 215.

In the meantime, unexplained second substrate 220, a polarizing plate 221, a protective film 222, and a protective member 230 are identical to the first embodiment, description of which will be omitted.

A method for fabricating an in-cell type touch panel in accordance with a preferred embodiment of the present invention will be described. Though the method will be described taking the in-cell type touch panel of the first embodiment as an example, the in-cell type touch panels of other embodiments are also applicable by changing arrangements of the sensor driving electrodes and the sensor sensing electrodes.

FIGS. 9A~9F illustrate plan views showing the steps of a method for fabricating a sensor driving electrode in an in-cell type touch panel in accordance with a first preferred embodiment of the present invention, and FIGS. 10A~10F illustrate plan views showing the steps of a method for fabricating a sensor sensing electrode in an in-cell type touch panel in accordance with a first preferred embodiment of the present invention.

Referring to FIGS. 9A and 10A, a metal is patterned on a first substrate to form a plurality of gate lines 171 and sensor driving lines 141 extended in one direction. The gate line 171 has a gate electrode 171*a* projected therefrom, and the sensor driving line 141 has a sensor driving contact electrode 141*a* projected therefrom.

Then, a gate insulating film 111 is formed on an entire surface.

Referring to FIGS. 9B and 10B, a semiconductor layer is patterned to form a semiconductor layer pattern 151 overlapped with the gate electrode 171*a*.

Referring to FIGS. 9C and 10C, a transparent conductive film is patterned on the gate insulating film 111 to form a pixel electrode 152 on the pixel region.

Referring to FIGS. 9D and 10D, metal is deposited on the gate insulating film 111 including the pixel electrode 152, and patterned to form a data line 153 to cross the gate line to define a pixel region and a read out line 142 parallel to the data line 153. In this instance, the data line 153 is projected to overlap with the gate electrode 171*a* to form a 'C' type source electrode 152*a* and a drain electrode 153*b* spaced from the source electrode 152*a*, together with the data line 153 and the read out line 142.

In this instance, the data line is crossed the gate line to define a unit pixel, and the read out line 142 is formed for a block of pixels. The read out line 142 has a read out contact electrode 142*a* projected from one side thereof.

Then, a protective film 116 is formed on an entire surface of the gate insulating film 111 including the data line 153 and the read out line 142.

Referring to FIGS. 9E and 10E, the protective film 116, and the gate insulating film 111 are patterned, to form a first contact hole 161 which exposes the sensor driving contact electrode 141*a*, and a second contact hole 162 which exposes the sensor sensing contact electrode 142*a*. In this instance, as shown in FIG. 10E, the second contact hole 162 is defined by patterning the protective film 116 only, and the first contact hole 161 is defined by patterning to expose the sensor driving line 141 passed through the protective film 116 and the gate insulating film 111.

Then, a transparent conductive film is deposited on an entire surface, and patterned, to form a sensor driving electrode 113 connected to the sensor driving contact electrode 141*a* through the first contact hole 161 as shown in FIG. 9F, and a sensor sensing electrode 114 connected to the read out contact electrode 142*a* through the second contact hole 162 as shown in FIG. 10F.

In this instance, the sensor driving electrode 113 and the sensor sensing electrode 114 may have a plurality of slits in a pixel.

In the meantime, with above steps, a pixel thin film transistor TFT (See FIGS. 9F and 10F) is formed to include the gate electrode 171*a*, the semiconductor layer pattern 151, the source electrode 153*a*, and the drain electrode 153*b* formed for each pixel at a crossed portion of the gate line 171 and the data line 153.

The capacitance change improved by the in-cell type touch panel of the present invention will be discussed with reference to the following experiment.

Figure 11A:
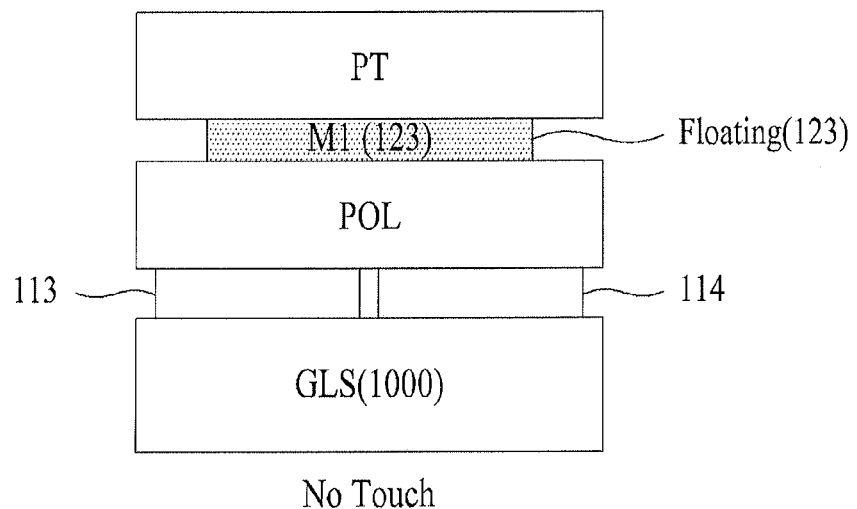
FIGS. 11A and 11B illustrate experimental examples in which three electrodes are applied according to an in-cell type touch panel in accordance with a preferred embodiment of the present invention, respectively.
Figure 11B:
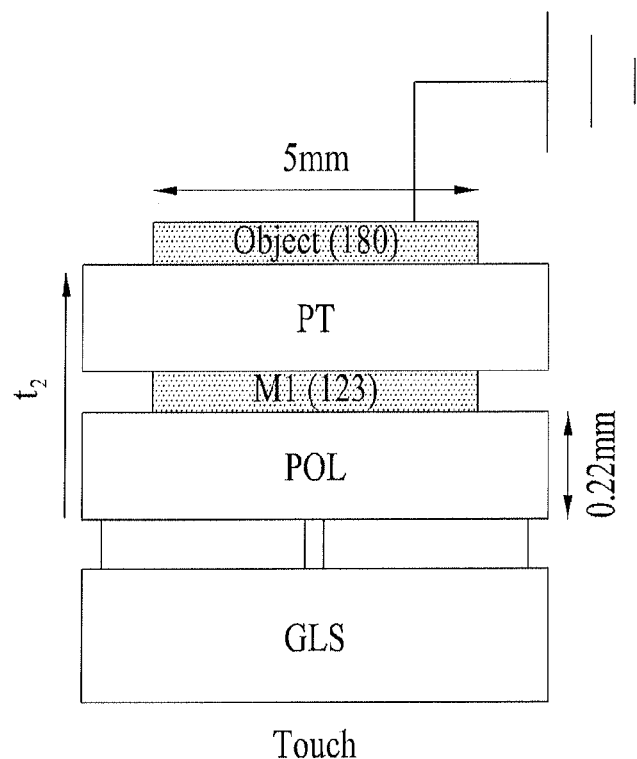

FIGS. 11A and 11B illustrate experimental examples in which three electrodes are applied according to an in-cell type touch panel in accordance with a preferred embodiment of the present invention, respectively. For conveniences' sake, a liquid crystal layer and arrays in a display panel are simplified in the experiment.

Referring to FIG. 11A, in the simplified structure, the in-cell type touch panel of the present invention has the sensor driving electrode 113 and the sensor sensing electrode 114 arranged on a glass substrate GLS 1000, and the sensor electrode 123 on the polarizing plate POL overlapped with the sensor driving electrode 113 and the sensor sensing electrode 114. And, the protective member PT is arranged to cover the sensor electrode 123.

In this instance, though it is selected that the touch object 180 has a width of 5 mm, and the polarizing plate POL has a thickness of 0.22 mm, the sizes are not limited to those.

While the sensor electrode 123 is maintained a floated state before the touch is made as shown in FIG. 11A, if the sensor electrode 123 is assumed to be the node A, a reduction of the capacitance at the node A takes place compared to a time before the touch is made owing to the touch object 180 acting as a ground source as shown in FIG. 11B at the time the touch is made.

This will be discussed with reference to graphs.

Figure 12:
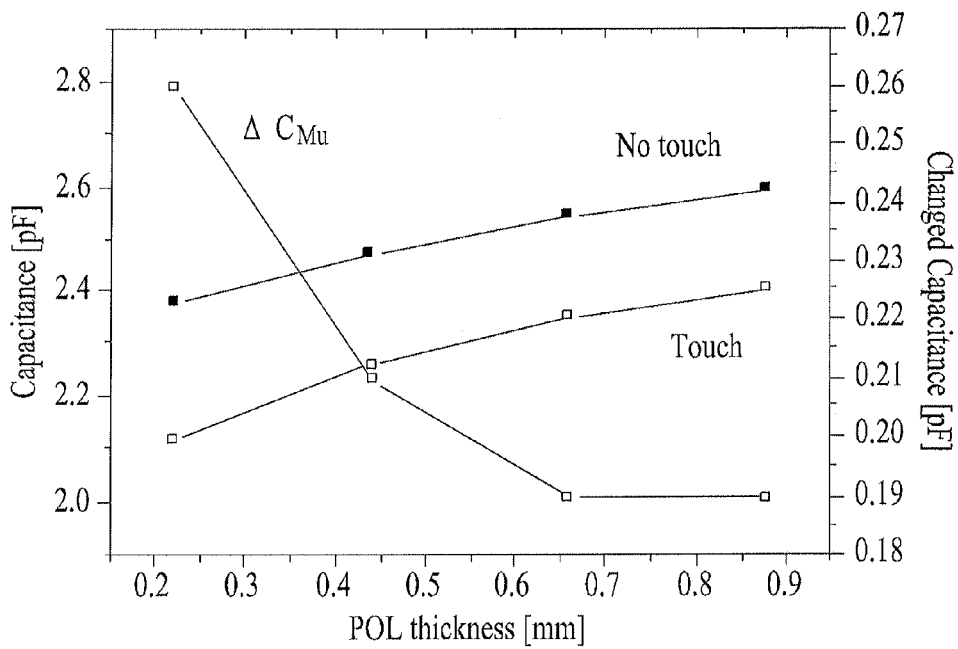
FIG. 12 illustrates a graph showing a change of capacitance before and after a touch come from a thickness change of a polarizing plate in a case two electrodes are applied.

FIG. 12 illustrates a graph showing a change of capacitance before and after a touch come from a thickness change of a polarizing plate in a case two electrodes are applied.

In a case two electrodes are applied, the sensor driving electrode and the sensor sensing electrode are arranged adjacent to each other on the glass substrate, and the polarizing plate is arranged to cover the sensor driving electrode and the sensor sensing electrode.

In this case, the touch object on the polarizing plate acts as the ground source at the time of the touch.

Referring to FIG. 12, a trend is shown, in which a difference of capacitance before and after the touch is reduced gradually with a thickness of the polarizing plate, wherein it can be known that Δmu is reduced from 2.8 pF to 2.0 pF in an initial 0.2 mm~0.7 mm section, and the Δmu is 2.0 pF substantially when the thickness of the polarizing plate is thicker than 0.7 mm. It implies that, if the polarizing plate of the display panel having a touch sensor with two electrodes has a thickness thicker than 0.7 mm, it is difficult to obtain the difference of the capacitance larger than 2.0 pF. That is, if the sensor driving electrode and the sensor sensing electrode are provided as the two electrodes of the touch sensor in the TFT array substrate like an in-cell structure actually, and if it is taken into account that a sum of the thicknesses of at least the glass substrate and the polarizing plate disposed between the touch object and touch sensor is thicker than 0.5 mm, it is difficult to provide the difference of the capacitance of larger than 2.0 pF before and after the touch.

Figure 13:
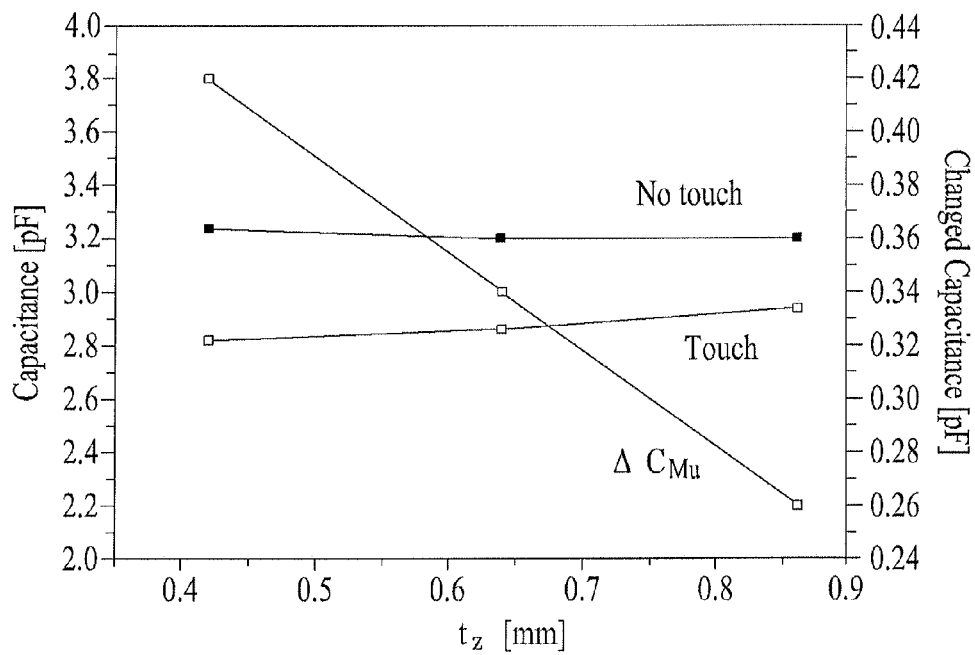
FIG. 13 illustrates a graph showing a change of capacitance before and after a touch come from a thickness change of a polarizing plate according to FIGS. 11A and 11B.

FIG. 13 illustrates a graph showing a change of capacitance before and after a touch come from a thickness change of a polarizing plate according to FIGS. 11A and 11B.

The in-cell type touch panel of the present invention has structures as shown in FIGS. 11A and 11B before and after the touch. In this case, a sum t2 of the thicknesses of the protective member PT, the sensor electrode 123, and the polarizing plate exists between the touch object 180, and the sensor driving electrode 113 and the sensor sensing electrode 114.

In this case, the graph shows that the difference of capacitance Δmu come from the thickness t2 is reduced linearly in a negative slope when the thickness t2 increases from 0.4 mm to 0.9 mm. In this case, even in a case the glass substrate and the polarizing plate is provided within the thickness t2 to exceed the thickness of 0.5 mm, since a capacitance change of from 3.5 pF to 2.2 pF shows, it can be known that the in-cell type touch panel of the present invention shows an adequate increase of the difference of the capacitance in comparison to the two electrode structure, thereby permitting to expect a touch sensing more accurate than before.

The in-cell type touch panel of the present invention has a plurality of sensor driving lines formed on the TFT array substrate, a plurality of read out lines formed to cross the sensor driving lines, the sensor electrodes formed at every cross portion of the sensor driving lines and the read out lines, the insulating film formed between the sensor driving lines (Or sensor driving electrodes) and the sensor electrodes to form the first capacitance, and the insulating film provided between the read out lines (Or the sensor sensing electrodes) and the sensor electrodes to form the second capacitance.

And, there is the insulating body provided to the top side of the sensor electrode additionally to form the sensing capacitance between the sensor electrode and the touch object.

The sensor driving signal is applied to the plurality of the sensor driving lines. At the time of supply of the sensor driving signal, the voltage change or the charge quantity change caused by the coupling capacitance of the first capacitance, the sensor capacitance, and the second capacitance is read in through the read out driver connected to the read out lines, to detect whether the touch is made or not and the touch position.

As has been described, the in-cell type touch panel of the present invention has the following advantages.

First, the formation of the flat type sensor electrode overlapped with the sensor driving electrode (First common electrode) and the sensor sensing electrode (Second common electrode) permits to have a large capacitance change at the time of the touch, thereby providing good touch sensitivity.

Second, the utilization of the common electrode or line as the sensor driving electrode and the sensor sensing electrode as they are permits to fabricate the in-cell type touch panel of the present invention by using a production line of an IPS type display panel which uses a general in-plane mode or a fringe filed mode without addition of a fabrication step to the display panel.

Third, since no additional step is required, enabling not to increase a number of masks required for a general in-plane mode or a fringe filed mode, a low cost fabrication is possible.

Fourth, even if misalignment between the sensor driving electrode/the sensor sensing electrode and the sensor electrode takes place, since overlap between the sensor electrode and the sensor driving electrode/the sensor sensing electrode is fixed with a sensor electrode area, making the misalignment not to affect the capacitance change and the sensitivity much, fabrication of the touch sensors having a uniform quality is possible.

Fifth, multiple touch is made available with the self capacitance type.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An in-cell type touch panel comprising:
a first substrate and a second substrate opposing each other with a liquid crystal layer disposed therebetween;
a gate line and a data line that cross each other to define a pixel region, a pixel electrode at the pixel region, a pixel thin film transistor connected to the gate line and the data line that drives the pixel electrode, and a pixel overlapped with the pixel electrode to have a common electrode divided by patterning in a surface of the first substrate;
a sensor electrode on a back side of the second substrate; and
a touch sensor that senses a capacitance change between the sensor electrode and the pixel, and a capacitance change between the sensor electrode and a touch object over the sensor electrode, and outputs a sensing signal.

2. The in-cell type touch panel as claimed in claim 1, further comprising a sensor driving line that supplies a sensing driving voltage to the touch sensor at the time of touch sensing, and a read out line that outputs the sensing signal from the touch sensor.

3. The in-cell type touch panel as claimed in claim 2, wherein at least one of the sensor driving line and the read out line is formed of metal on the same layer with one of the gate line or the data line.

4. The in-cell type touch panel as claimed in claim 3, wherein the sensor driving line is formed of the same metal, and on the same layer, with the gate line, and the read out line is formed of the same metal, and on the same layer, with the data line.

5. The in-cell type touch panel as claimed in claim 2, wherein the common electrode is driven divided in the touch sensing and the display, wherein, in the display, a common voltage is applied to the common electrodes.

6. The in-cell type touch panel as claimed in claim 2, wherein the gate line is used as the sensor driving line.

7. The in-cell type touch panel as claimed in claim 2, wherein the common electrode includes a first common electrode and a second common electrode arranged alternately, wherein each of the first and second common electrodes is arranged for a block of pixels.

8. The in-cell type touch panel as claimed in claim 7, wherein the sensor electrode is in an island shape in which the sensor electrode overlaps with one first common electrode and a portion of each of the second common electrodes adjacent to the one first common electrode.

9. The in-cell type touch panel as claimed in claim 7, wherein each of the first common electrode and the second common electrode has at least one slit.

10. The in-cell type touch panel as claimed in claim 7, wherein the first common electrode is connected to the sensor driving line, and the second common electrode is connected to the read out line.

11. The in-cell type touch panel as claimed in claim 10, further comprising a protective film provided between the read out line and the first and second common electrodes, and a stack of a gate insulating film and a protective film between the sensor driving line and the first and second common electrodes.

12. The in-cell type touch panel as claimed in claim 10, wherein the capacitance between the pixel and the sensor electrode is a sum of capacitance between the first common electrode and the sensor electrode, and capacitance between the second common electrode and the sensor electrode.

13. The in-cell type touch panel as claimed in claim 2, wherein the common electrode is divided taking the sensor driving line as a boundary.

14. The in-cell type touch panel as claimed in claim 13, wherein the common electrode is connected to the read out line.

15. The in-cell type touch panel as claimed in claim 14, wherein the sensor electrode is formed in a direction to cross the common electrodes in an island shape in which the sensor electrode overlaps with an entire width of one center common electrode and a portion of a width of each of the common electrodes adjacent to both of the one center common electrode.

16. The in-cell type touch panel as claimed in claim 13, wherein the capacitance between the pixel and the sensor electrode is a sum of capacitance between the sensor driving line and the sensor electrode, and capacitance between the common electrode and the sensor electrode.

17. The in-cell type touch panel as claimed in claim 1, wherein the sensor electrode is in a floating state.

18. The in-cell type touch panel as claimed in claim 1, further comprising a protective member between the sensor electrode and the touch object.

19. The in-cell type touch panel as claimed in claim 18, wherein the protective member is formed of glass or a transparent film.

20. The in-cell type touch panel as claimed in claim 1, further comprising a polarizing plate on a back side of the second substrate, and the sensor electrode is attached on a top side of the polarizing plate.

21. The in-cell type touch panel as claimed in claim 20, further comprising a transparent protective film on the polarizing plate, and the sensor electrode is formed on the transparent protective film by patterning.

* * * * *